Patented Nov. 21, 1933

1,935,735

UNITED STATES PATENT OFFICE 1,935,735

METHOD OF MAKING FROZEN CONFECTIONS

Charles B. Chauvin, St. Louis, Mo.

No Drawing. Application August 28, 1933
Serial No. 687,178

3 Claims. (Cl. 99—11)

My invention relates to confections and method of forming the same and more particularly to confections formed with a banana as the base or center. Heretofore, confections of this type that have been made and sold have had two major deficiencies. First, they have been subject to quick spoilage so that in many cases within a few hours after they were made they would deteriorate to a marked degree in both appearance and taste and, second, they were so indigestible that commercial success was impossible.

The object of my invention is to provide a method of preparing a banana confection which method obviates the deficiencies heretofore existent.

The preferred form of preparing a banana confection under my method is as set forth in the following description wherein for the sake of clarity the method is stated for an individual article although, of course, it is apparent that in commercial practice a large number of articles are prepared at the same time:

The banana is put in a suitable oven, which may be part of a heating unit or may be a hot room, wherein the temperature is preferably from one hundred and ten to one hundred and twenty degrees Fahrenheit and the banana remains in this oven for a period of from five to twenty-five minutes as governed by the temperature of the fruit when placed in the oven and until the fruit has reached substantially the same temperature as that prevailing in the oven. During this heating process injurious properties in the fruit are driven off in the form of gas, but the fruit is not cooked in the common sense of the word in that its taste is not changed to any appreciable extent by the heating.

When the heating has been concluded as stated above the banana is taken from the oven and the skin is removed. The skinned fruit is then placed in a refrigerator which may be a cabinet or may be a cold room wherein the temperature is preferably from zero to ten degrees below zero Fahrenheit and then is allowed to remain therein until chilled so that the pores in the surface of the banana are closed. This chilling preferably is continued only for a short period.

After removal from the refrigerator the banana is covered with a coating of chocolate or other edible material by any suitable means such as dipping. The confection then may be placed in an envelope or wrapping of waxed or other similar paper. The wrapped confection is then returned to the refrigerator where it remains until frozen and after which it is ready for delivery and sale. Although the time required for freezing may vary somewhat I have found that a period of six hours in a refrigerator at the temperatures stated above is sufficient for this purpose.

While, as stated above, any suitable edible coating may be used I prefer the coating is such that an air-tight covering for the fruit is formed thereby. For such coating I have used successfully a coating consisting of one part of a material known to the trade as "cocoa butter" to four parts chocolate. This material is chipped and heated by steam until thoroughly dissolved and then cooled to a temperature of forty degrees before being applied to the banana. No matter what coating is used I prefer that it be cooled to about the same temperature before it is applied to the fruit.

In some cases it may be desired to mount the banana or other fruit on a handle such as a wooden skewer or other rod and as the fruit is so mounted I prefer that the skewer or rod be inserted therein before the coating is applied so that the air-tight condition of the fruit will not be impaired as might be the case if the skewer or rod were inserted after the fruit had been coated.

If the banana is prepared according to the method set forth in the above description or according to the method defined in the appended claims deterioration of the fruit after preparation of the confection will be prevented and the digestible qualities of the fruit will be greatly improved. Obviously, while in the specification I have given a complete method by the practice of which best results are obtained, I do not intend to limit myself to any particular method or practice except as included in the appended claims. This case is a continuation in part of my copending application Serial No. 606,197, filed April 22, 1932.

What I claim as new and desire to secure by Letters Patent, is:—

1. A method of preparing a banana confection including dry heating the banana, then removing the skin therefrom, chilling said skinned banana, applying thereto a covering of edible material, and then freezing the resultant confection.

2. A method of preparing a banana confection including dry heating the banana to a temperature of approximately one hundred ten degrees Fahrenheit, removing the skin from said banana, chilling said banana and then applying an air-tight coating of edible material to said chilled banana.

3. A method of preparing a banana confection including dry heating the banana to a temperature of approximately one hundred ten degrees Fahrenheit, removing the skin from said banana, chilling said banana, applying an air-tight coating of edible material to said chilled banana, and then freezing the resultant confection.

CHARLES B. CHAUVIN.